(12) United States Patent
Lauridsen et al.

(10) Patent No.: US 8,788,953 B2
(45) Date of Patent: *Jul. 22, 2014

(54) SUMMARIZING PORTLET USAGE IN A PORTAL PAGE

(75) Inventors: Christina K. Lauridsen, Austin, TX (US); Malcolm C. Ong, Pflugerville, TX (US); Lauren G. Wilcox, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/420,094

(22) Filed: Mar. 14, 2012

(65) Prior Publication Data

US 2012/0204121 A1 Aug. 9, 2012

Related U.S. Application Data

(63) Continuation of application No. 11/872,238, filed on Oct. 15, 2007, now Pat. No. 8,191,002.

(51) Int. Cl.
*G06F 3/00* (2006.01)
*G06F 3/048* (2013.01)
*G06F 15/16* (2006.01)

(52) U.S. Cl.
USPC ........... 715/760; 715/733; 715/745; 715/764; 715/765; 715/789; 709/224

(58) Field of Classification Search
None
See application file for complete search history.

(56) References Cited

U.S. PATENT DOCUMENTS

| | | | |
|---|---|---|---|
| 5,995,106 A * | 11/1999 | Naughton et al. | 715/854 |
| 6,208,995 B1 | 3/2001 | Himmel | |
| 6,411,996 B1 | 6/2002 | Albers | |
| 6,643,641 B1 * | 11/2003 | Snyder | 707/709 |
| 6,725,227 B1 | 4/2004 | Li | |
| 6,931,416 B2 | 8/2005 | Kelley et al. | |

(Continued)

FOREIGN PATENT DOCUMENTS

| | | |
|---|---|---|
| CN | 2008801115289 | 10/2008 |
| CN | 2010800490180 | 8/2010 |

(Continued)

OTHER PUBLICATIONS

Office Action, U.S. Appl. No. 12/984,575, filed Jan. 4, 2011, In Re Christina K Lauridsen, mailing date Jun. 5, 2012, 44 pages.

(Continued)

*Primary Examiner* — Matt Kim
*Assistant Examiner* — Yongjia Pan
(74) *Attorney, Agent, or Firm* — Parashos T. Kalaitzis; Amy J. Pattillo

(57) ABSTRACT

A portal summary controller stores detected usage of at least one instance of at least one portlet application within at least one portal page at each of a plurality of different times. The portal summary controller dynamically creates a summary portal page displaying a separate instance of the at least one portlet application for at least one of each of the plurality of different times specified according to the detected usage separately stored at each of the plurality of different times, wherein the summary portal page provides a summary of at least a selection of a previous usage of the at least one portal page comprising each separate instance of the at least one portlet application that functions as if placed on the at least one portal page.

15 Claims, 5 Drawing Sheets

(56) References Cited

U.S. PATENT DOCUMENTS

| | | | |
|---|---|---|---|
| 6,941,339 B1 | 9/2005 | McMichael | |
| 6,959,319 B1 | 10/2005 | Huang et al. | |
| 7,003,735 B2 | 2/2006 | Edlund et al. | |
| 7,062,511 B1 | 6/2006 | Poulsen | |
| 7,076,463 B1 | 7/2006 | Boies et al. | |
| 7,096,219 B1 | 8/2006 | Karch | |
| 7,139,978 B2 | 11/2006 | Rojewski et al. | |
| 7,178,096 B2 | 2/2007 | Rangan et al. | |
| 7,185,089 B2 | 2/2007 | Satomi et al. | |
| 7,200,568 B2 | 4/2007 | Dodd | |
| 7,203,909 B1 | 4/2007 | Horvitz et al. | |
| 7,216,287 B2 | 5/2007 | Colson | |
| 7,269,664 B2 | 9/2007 | Hutsch et al. | |
| 7,289,983 B2 | 10/2007 | Best et al. | |
| 7,337,370 B2 | 2/2008 | Haynes et al. | |
| 7,366,795 B2 | 4/2008 | O'Neil et al. | |
| 7,366,990 B2 | 4/2008 | Pitroda | |
| 7,376,652 B2 | 5/2008 | Hayes-Roth | |
| 7,426,548 B2 | 9/2008 | Griffin et al. | |
| 7,536,637 B1 | 5/2009 | Nauerz et al. | |
| 7,624,160 B2 | 11/2009 | Henderson et al. | |
| 7,770,101 B2 | 8/2010 | Hesmer et al. | |
| 7,895,234 B2 | 2/2011 | Lillie et al. | |
| 7,904,818 B2 | 3/2011 | Lauridsen et al. | |
| 7,949,692 B2 * | 5/2011 | Lemar et al. | 707/822 |
| 8,302,012 B2 * | 10/2012 | Schmitt | 715/742 |
| 8,312,170 B2 * | 11/2012 | Ng et al. | 709/246 |
| 2001/0034771 A1 | 10/2001 | Hutsch et al. | |
| 2002/0029296 A1 | 3/2002 | Anuff et al. | |
| 2002/0152242 A1 | 10/2002 | Meyer et al. | |
| 2003/0101412 A1 | 5/2003 | Eid | |
| 2004/0010598 A1 | 1/2004 | Bales et al. | |
| 2004/0049589 A1 | 3/2004 | Papanikolaou et al. | |
| 2004/0167896 A1 | 8/2004 | Eakin | |
| 2004/0187111 A1 | 9/2004 | Eakin | |
| 2004/0243928 A1 * | 12/2004 | Hesmer et al. | 715/505 |
| 2005/0065913 A1 * | 3/2005 | Lillie et al. | 707/3 |
| 2005/0246632 A1 | 11/2005 | Guido et al. | |
| 2005/0256940 A1 * | 11/2005 | Henderson et al. | 709/219 |
| 2005/0267789 A1 | 12/2005 | Satyadas | |
| 2005/0273717 A1 | 12/2005 | Breeden et al. | |
| 2005/0278323 A1 | 12/2005 | Horvitz et al. | |
| 2005/0278562 A1 | 12/2005 | Haynes et al. | |
| 2006/0026557 A1 | 2/2006 | Petri | |
| 2006/0031849 A1 | 2/2006 | Barta et al. | |
| 2006/0036734 A1 | 2/2006 | Breeden | |
| 2006/0036954 A1 | 2/2006 | Satyadas et al. | |
| 2006/0053376 A1 | 3/2006 | Ng et al. | |
| 2006/0059125 A1 | 3/2006 | Yan | |
| 2006/0064406 A1 | 3/2006 | Ehrich et al. | |
| 2006/0064422 A1 | 3/2006 | Arthurs et al. | |
| 2006/0095676 A1 | 5/2006 | Dzierzon | |
| 2006/0277199 A1 | 12/2006 | Joret et al. | |
| 2006/0282819 A1 | 12/2006 | Graham et al. | |
| 2006/0287919 A1 | 12/2006 | Rubens et al. | |
| 2007/0016893 A1 | 1/2007 | Branda et al. | |
| 2007/0038599 A1 * | 2/2007 | Pearson | 707/3 |
| 2007/0043766 A1 | 2/2007 | Nicholas et al. | |
| 2007/0067722 A1 | 3/2007 | Ames et al. | |
| 2007/0094595 A1 * | 4/2007 | Heck et al. | 715/700 |
| 2007/0112913 A1 * | 5/2007 | Bales | 709/204 |
| 2007/0260702 A1 | 11/2007 | Richardson et al. | |
| 2007/0288488 A1 | 12/2007 | Rohrs et al. | |
| 2007/0300179 A1 | 12/2007 | Friedlander | |
| 2008/0016116 A1 | 1/2008 | Tarr | |
| 2008/0033921 A1 | 2/2008 | Arrouye et al. | |
| 2008/0034420 A1 | 2/2008 | Chang | |
| 2008/0040313 A1 | 2/2008 | Schachter | |
| 2008/0052369 A1 * | 2/2008 | Weber et al. | 709/217 |
| 2008/0052372 A1 | 2/2008 | Weber et al. | |
| 2008/0072145 A1 | 3/2008 | Blanchard et al. | |
| 2008/0091985 A1 | 4/2008 | Haynes et al. | |
| 2008/0097986 A1 | 4/2008 | Shih et al. | |
| 2008/0097987 A1 | 4/2008 | Shih et al. | |
| 2008/0120343 A1 | 5/2008 | Altrichter et al. | |
| 2008/0127133 A1 | 5/2008 | Aghara et al. | |
| 2008/0154949 A1 | 6/2008 | Brooks et al. | |
| 2008/0201645 A1 | 8/2008 | Francis et al. | |
| 2008/0270924 A1 | 10/2008 | Yordanov et al. | |
| 2008/0281769 A1 | 11/2008 | Hibbets | |
| 2009/0031401 A1 | 1/2009 | Cudich et al. | |
| 2009/0063442 A1 | 3/2009 | Gaurav et al. | |
| 2009/0100358 A1 | 4/2009 | Lauridsen et al. | |
| 2009/0182727 A1 | 7/2009 | Majko | |
| 2009/0217352 A1 | 8/2009 | Shen et al. | |
| 2009/0235149 A1 | 9/2009 | Frohwein | |
| 2010/0017385 A1 | 1/2010 | Wilcox | |
| 2010/0070482 A1 | 3/2010 | Punaganti Venkata et al. | |
| 2011/0055193 A1 | 3/2011 | Lauridsen et al. | |
| 2011/0106835 A1 | 5/2011 | Lauridsen et al. | |
| 2011/0131501 A1 | 6/2011 | Lauridsen et al. | |
| 2011/0271171 A1 | 11/2011 | Wilcox et al. | |

FOREIGN PATENT DOCUMENTS

| | | |
|---|---|---|
| DE | 10015173 | 10/2001 |
| EP | 08840677 | 10/2008 |
| JP | 2005-506617 A | 3/2005 |
| JP | 2006107012 | 4/2006 |
| JP | 2007-133871 A | 5/2007 |
| JP | 2010528434 | 10/2008 |
| JP | 2012535697 | 8/2010 |
| KR | 2006084865 | 7/2006 |
| KR | 1020107007422 | 10/2008 |
| TW | 097137473 | 9/2008 |
| TW | 099132807 | 9/2010 |
| WO | 2008063769 | 10/2008 |
| WO | 2008063770 | 10/2008 |
| WO | 2009050156 | 10/2008 |
| WO | 2010062738 | 8/2010 |

OTHER PUBLICATIONS

Final Office Action, U.S. Appl. No. 13/166,394, filed Jun. 22, 2011, in re Wilcox, mailing date Jun. 20, 2012, 15 pages.
Office Action, U.S. Appl. No. 13/166,394, filed Jun. 22, 2011, in re Wilcox, mailing date Jan. 19, 2012, 14 pages.
Final Office Action, U.S. Appl. No. 12/608,423, filed Oct. 29, 2009, mailing date Jan. 19, 2012, 15 pages.
Final Office Action, U.S. Appl. No. 12/547,853, filed Aug. 26, 2009, mailing date Apr. 17, 2012, 15 pages.
Del.icio.us, retrieved from the Internet on May 17, 2008 at http://del.icio.us/, Yahoo! Inc, 3 pages.
International Search Report and Written Opinion dated Dec. 1, 2010 for International Application No. PCT/EP2010/062738, 13 pages.
USPTO U.S. Appl. No. 12/174,420, 2 pages.
USPTO U.S. Appl. No. 12/608,423, 2 pages.
USPTO U.S. Appl. No. 12/547,853, 2 pages.
Extensible Markup Language (XML), World Wide Web Consortium, retrieved from the Internet on May 17, 2008 at http://www.w3.org/XML/, World Wide Web Consortium, 5 pages.
JSR 168: Portlet Specification, Sun Microsystems, retrieved from the Internet on May 17, 2008 at http://www.jcp.org/en/jsr/detail?id=168, Sun Microsystems, 9 pages.
Diaz, Oscar et al, "Tagging-Aware Portlets", ICWE 2009, LNCS 5648, Engineering, Berlin, Jun. 24, 2009, XP019120503, ISBN: 978-3-642-02817-5, pp. 61-75.
International Search Report dated Dec. 29, 2008 for International Application No. PCT/EP2008/063770, 10 pages.
International Search Report dated Dec. 29, 2008 for International Application No. PCT/EP2008/063769, 10 pages.
Coles, Alistair et al, "A Framework for Coordinated Multi-Model Browsing with Multiple Clients", WWW2003, pp. 718-726.
Firan, Claudius et al, "The Benefit of Using Tag-Based Profiles", IEEE, Fifth Latin American Web Congress, 2007, pp. 32-41.
Hong, Lichan et al, "SparTag.us: A Low Cost Tagging System for Foraging of Web Content", AVI 2008, pp. 65-72.
Storey, Margaret-Anne et al, "Waypointing and Social Tagging to Support Program Navigation", CHI 2006, pp. 1367-1372.

(56) References Cited

OTHER PUBLICATIONS

Strauss, Howard, "What is a Portal, Anyway?", Tech Talks Event, From Internet, Jan. 20, 2000, 9 pages.
Patil, Aashish, "Unclog the Server Bottleneck With Active Containers", JAVA Technology Article, Apr. 6, 2004, [Online], [Retrieved on Aug. 21, 2007]. Retrieved from the Internet <URL: http://www-128.ibm.com/developerworks/web/library/wa-actcont/index.html>.
"IBM File Server", Online Manual for Websphere Portal Version 5.1, copyright International Busienss Machines Corporation, Jun. 14, 2007 [Online], [Retrieved on Aug. 21, 2007]. Retrieved from the Internet <URL: http://publib.boulder.ibm.com/infocenter/wpdoc/v510/index.jsp?topic=/com.ibm.wp.zos.doc/portlets/file_server.html>.
Allamaraju, Subbu, "Portlet Preferences", article under Dev2Dev, Feb. 2, 2004 [online], [retrieved on Aug. 21, 2007]. Retrieved from the Internet <URL: http://dev2dev.bea.com/pub/a/2004/02/portlet_preferences.html>.
Hepper et al, "Caching data in JSR 168 portlets with Websphere Portal V5.1", Websphere Article, Aug. 31, 2005, [online], [retrievd on Aug. 21, 2008]. Retrieved from the Internet <URL:http://www-128.ibm.com/developerworks/websphere/library/techarticles/0508_hepper/0508_hepper.html>.
Offline Portal Content, Everyplace Access Services for Websphere Software, [online], [retrieved on Aug. 21, 2007]. Retrieved from the Internet <URL: http://publib.boulder.ibm.com/infocenter/weahelp/5.1/index.jsp?topic=/com.ibm.websphere.eas.doc/ovr_offline.html>.
Offline Content, Everplace Access Services for Websphere Software, [online], [retrieved on Aug. 21, 2007]. Retrieved from the Internet <URL: http://publib.boulder.ibm.com/infocenter/weahelp/5.1/index.jsp?topic=/com.ibm.websphere.eas.doc/dev_offline.html>.
JSR 162: Portlet API, Jan. 22, 2002, [online], [retrieved on Aug. 21, 2007]. Retrieved from the Internet <URL:http://www.jcp.org/en/jsr/detail?id=162>.
USPTO Office Action, in re Lauridsen, U.S. Appl. No. 11/872,241, filed Oct. 15, 2007, mailing date Sep. 16, 2010, 17 pages.
Lauridsen et al, USPTO Notice of Allowance, U.S. Appl. No. 11/872,241, filed Oct. 15, 2007, mailing date Nov. 3, 2010, 4 pages.
Notice of Allowance, mailing date Jan. 23, 2012, U.S. Appl. No. 11/872,238, filed Oct. 15, 2007, Christina K. Lauridsen, 20 pages.
Notice of Allowance, mailing date Sep. 30, 2011, U.S. Appl. No. 11/872,238, filed Oct. 15, 2007, Christina K. Lauridsen, 27 pages.
Office Action, mailing date Mar. 21, 2011, U.S. Appl. No. 11/872,238, filed Oct. 15, 2007, Christina K. Lauridsen, 32 pages.
Jing Wu, et al., "Mining Personalization Interest and Navigation Patterns on Portal," Advances in Knowledge Discovery and Data Mining, Berlin, Heidelberg, vol. 4426, May 22, 2007, p. 948-955.
Office Action, U.S. Appl. No. 12/547,853, filed Aug. 26, 2009, mailing date Oct. 5, 2011, 10 pages.
Office Action, U.S. Appl. No. 12/174,420, filed Jul. 16, 2008, mailing date Dec. 27, 2010, 25 pages.
Office Action, U.S. Appl. No. 12/608,423, filed Oct. 29, 2009, mailing date Oct. 5, 2011, 10 pages.
Amendment, U.S. Appl. No. 12/608,423, filed Oct. 29, 2009, submitted Dec. 21, 2011, 12 pages.
Interview Summary, U.S. Appl. No. 12/174,420, filed Jul. 16, 2008, mailing date Mar. 22, 2011, 4 pages.
Amendment, U.S. Appl. No. 12/174,420, submitted Mar. 24, 2011, 20 pages.
http://support.mozilla.com/en-US/kb/Smart+Bookmarks+folders, accessed Aug. 19, 2009, 6 pages.
Community Systems Research at Yahoo, SIGMOD Record, vol. 36, No. 3, Sep. 2007, pp. 47-54, U.S. Appl. No. 12/547,853.
"Dogear Bookmarks", https://www.ibm.com/dogear; accessed Aug. 20, 2009, 6 pages, U.S. Appl. No. 12/547,853.
Interview Summary dated Apr. 16, 2012 for U.S. Appl. No. 13/166,394; 4 pages.
Interview Summary dated Jul. 13, 2012 for U.S. Appl. No. 12/547,853; 3 pages.
Response to Office Action filed Apr. 19, 2012 for U.S. Appl. No. 13/166,394; 22 pages.
Non-final Office Action, U.S. Appl. No. 12/984,575, filed Jan. 4, 2011, mailing date Nov. 29, 2012, 16 pages.
Notice of Allowance, U.S. Appl. No. 12/984,575, filed Jan. 4, 2011.
Final Office Action, U.S. Appl. No. 12/984,575, filed Jan. 4, 2011.
Appeal Brief filed, U.S. Appl. No. 12/608,423, filed Oct. 29, 2010.
Applicant's Remarks to a Non-Final Office Action, U.S. Appl. No. 12/608,423, filed Oct. 29, 2009.
Notice of Allowance, U.S. Appl. No. 12/547,853, filed Aug. 26, 2009.
Request for Continued Examination, U.S. Appl. No. 12/547,853, filed Aug. 26, 2009.
Notice of Allowance, U.S. Appl. No. 13/166,394, filed Jun. 22, 2011.
Request for Continued Examination, U.S. Appl. No. 13/166,394, filed Jun. 22, 2011.
Request for Continued Examination, U.S. Appl. No. 12/984,575, filed Jan. 4, 2011.
Applicant's response to a Non-final Office Action, U.S. Appl. No. 12/984,575, filed Jan. 4, 2011.
Applicant's response to a Non-final Office Action, U.S. Appl. No. 11/872,238, filed Oct. 15, 2007.
Interview Summary, U.S. Appl. No. 11/872,238, filed Oct. 15, 2007.
Request for Continued Examination, U.S. Appl. No. 11/872,238, filed Oct. 15, 2007.
Applicant's response to a Non-final Office Action, U.S. Appl. No. 11/872,241, filed Oct. 15, 2007.
Office Action, U.S. Appl. No. 12/174,420, filed Jul. 16, 2008.
Applicants' Response to a Non-Final Office Action, U.S. Appl. No. 12/174,420, filed Jul. 16, 2008.

\* cited by examiner

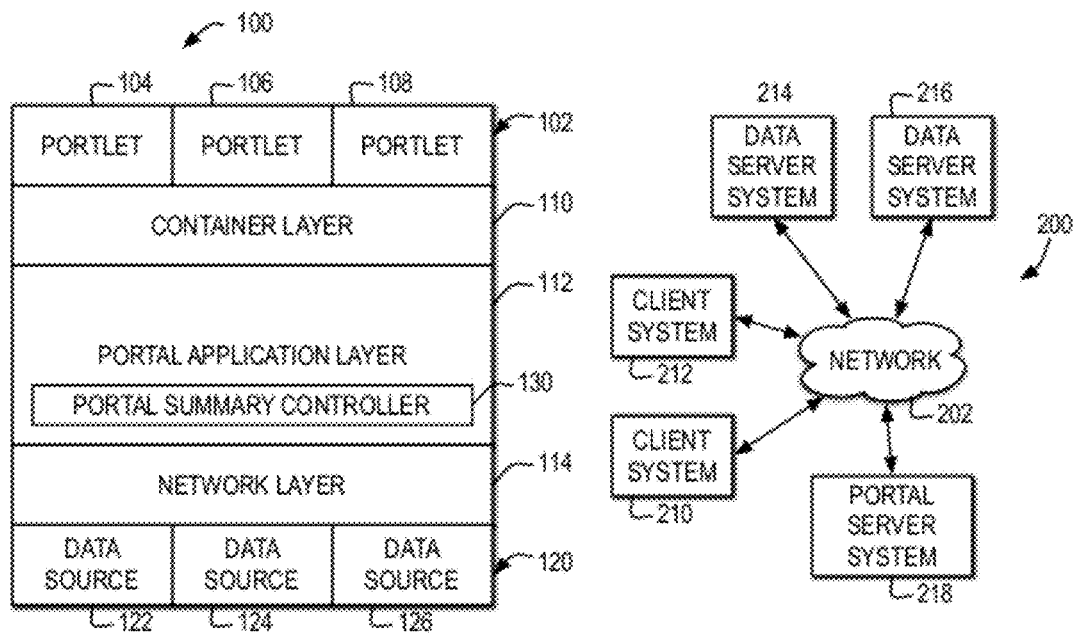
FIG. 1
FIG. 2
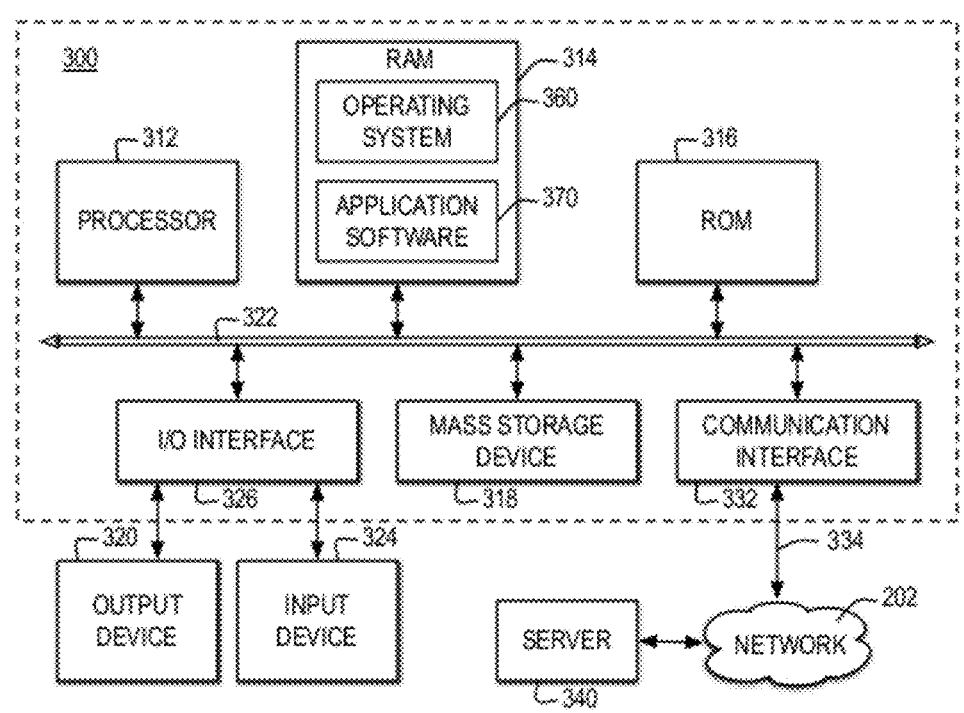
FIG. 3

SUMMARIZING PORTLET USAGE IN A PORTAL PAGE

CROSS-REFERENCE TO RELATED APPLICATIONS

The present application is related to co-pending application:
(1) U.S. patent application Ser. No. 11/877,241.

BACKGROUND OF THE INVENTION

1. Field of the Invention

The present invention relates generally to an improved data processing system and, in particular to an improved computer implemented method, system, and computer program product for monitoring and saving portlet usage and subsequently generating a portal page displaying one or more portlets as used at a particular point in time or over a period of time.

2. Description of the Related Art

As networks, such as the Internet, become more and more pervasive for content delivery and communication, better methods for displaying web contents and accessing web applications are being developed. One example of a technology that efficiently displays web content and accesses web applications is a portal. Portal programs or portal applications, whether run on a server delivering content or on a client system receiving content, provide an entry point for websites and back-end applications through a portal page viewable at a client system.

In one example, a portal application generates a portal page that includes instances of portlets. In general, a portlet is a web-based application that processes requests and generates dynamic content. End-users see an instance of a portlet as a specialized content area within a portal page. Depending on the content nature of the portlet, the user may select to view different types of content within the portlet instance or content area. For example, some portlets are database driven applications that access data from remote data sources based on the currently selected option from a list of data options available for the portlet instance and present the accessed data to the user through dynamically generated content, or markup fragments.

A portal page including instances of multiple database driven portlets may access live data for currently selected data options from different sources, bring all the data into a common portal page, and display dynamically generated graphical representations of the accessed live data by each of the portlet instances. Thus, through a portal page, the data that a user previously had to access through many separate windows, each displaying one type of data, the user can now view accumulated on one page, but still separately graphically represented. For example, instead of a user having to separately access web pages for each of news, sports scores, and stock prices and separately access productivity applications, such as calendars, for project progress, calendaring changes, and other productivity data, the user accesses one portal page which includes instances of multiple database driven portlets for separately displaying, within a single page, data from news, sports scores, and stock prices to project progress, calendaring changes, and other productivity data.

While the portal page with multiple portlet instances provides the user with a quick, single page in which to view multiple types of data from multiple sources as the data changes, users may need to rely on the data accessed in a portlet instance. Currently, portal pages that include portlets are limited, however, because once a portlet updates displayed data within the portlet instance, the previously displayed data is no longer available to the user. In addition, portals are limited because as a user adjusts which portlets are displayed within a portal page or the user adjusts the selected data option within a database driven portlet instance, the previous configuration of portlet instances and the previously selected data options are no longer available.

SUMMARY OF THE INVENTION

Therefore, the present invention provides a method, system, and program for monitoring and saving portal usage, including current portal data, current content dynamically generated for and displayed within portlet instances placed within a portal page, and the current data option selections for portlet instances within the portal page. In addition, in view of the foregoing, there is a need for a method, system, and program, subsequent to monitoring and saving portal usage, for creating an additional portal page and displaying a configurable summary of portlet instances specified according to the saved portal usage.

In one embodiment, a portal summary controller stores detected usage of at least one instance of at least one portlet application within at least one portal page at each of a plurality of different times. The at least one portlet application is operative to dynamically generate content for each of the at least one instance of the at least one portlet application based on a first data option selected from among a plurality of data options selectable within the at least one portlet application from a first selection of separate data accesses to at least one data storage system delivering a first selection of data for each at least one portlet application. The portal status recorder is operative to store the detected usage of the at least one instance of the at least one portlet application by storing the dynamically generated content for each of the at least one instance of the at least one portlet application and the first data option. Responsive to a trigger to generate a summary portal page, the portal summary controller dynamically creates a summary portal page displaying a separate instance of the at least one portlet application for at least one of each of the plurality of different times specified according to the separate usage stored at each of the plurality of different times, such that the summary portal page provides a summary of at least a selection of previous usage of the at least one portal page. The summary portal generator, responsive to a user selection to generate the summary portal page, is operative to dynamically create the summary portal page displaying at least one first instance of the at least one portlet application specified according to the stored detected usage comprising dynamically generated content and displaying a second instance of the at least one portlet application specified with a second selection of dynamically generated content generated based on the first data option in the detected usage from a current data access to the at least one data storage system delivering the second selection of data different from the first selection of data and not previously stored in the detected usage. The summary portal generator, responsive to detecting the dynamically generated content from the current data access, is operative to graphically distinguish the second selection of dynamically generated content from the dynamically generated content to visually distinguish the second selection of dynamically generated content from the dynamically generated content within the summary portal page.

A portal application dynamically generates content for each of the at least one instance of the at least one portlet application from separate data accesses to at least one data storage system delivering data for each at least one portlet application. The portal summary controller detects the usage and stores the detected usage of the at least one instance of the at least one portlet application by storing the dynamically generated content for each of the at least one instance of the at least one portlet application. The dynamically generated content includes dynamically generated HTML fragments. In storing content which includes dynamically generated HTML fragments, the portal summary controller performs at least one of capturing data points from the dynamically generated HTML fragments and storing the data points, storing the dynamically generated HTML fragments, and capturing a snapshot of the displayed HTML fragments and storing the captured snapshot.

Summary portal controller also detects portal usage including the data options selected within portlet instances, where each portlet instance includes multiple data options which each direct requests to a back end server for different types of data. The summary portal controller stores the data option selections and, in creating the summary portal page, specifies the portlet instance to access the data option previously stored. Based on the data option specified in the summary portal page for an instance, the summary portal controller triggers the portal application to access current data for the data option and dynamically generate content for display within the portlet instance.

The portal summary controller supports multiple interfaces. One interface supports a selectable option within particular instances within a at least one portal page or within at least one portal page in general which when selected, triggers recording of and storage of the usage of a particular portlet or the portal page. Another interface supports user specification of which records of portal usage to include in the summary portal page, such that the user specifies which previous portal usage to summarize in a portal page.

In another embodiment, a method for creating a portal page summarizing previous portal page usage includes dynamically generating content for each of at least one instance of at least one portlet application within at least one portal page based on a first data option selected from among a plurality of data options selectable within the at least one portlet application from a first selection of separate data accesses to at least one data storage system delivering a first selection of data for each at least one portlet application. The method includes storing detected usage of the at least one instance of the at least one portlet application within the at least one portal page separately at each of a plurality of different times by storing the dynamically generated content for each of the at least one instance of the at least one protlet application and the first data option. In addition, the method includes, responsive to a user selection to generate the summary portal page, dynamically creating a summary portal page displaying a separate instance of the at least one portlet application for at least one of each of the plurality of different times specified according to the detected usage separately stored at each of the plurality of different times, such that the summary portal page provides a summary of at least a selection of a previous usage of the at least one portal page by dynamically creating the summary portal page displaying at least one first instance of the at least one portlet application specified according to the stored detected usage comprising the dynamically generated content and displaying a second instance of the at least one portlet application specified with a second selection of dynamically generated content generated based on the first data option in the detected usage from a current data access to the at least one data storage system delivering the second selection of data different from the first selection of data and not previously stored in the detected usage. The method includes, responsive to detecting the dynamically generated content from the current data access, graphically distinguishing the second selection of dynamically generated content from the dynamically generated content to visually distinguish the second selection of dynamically generated content from the dynamically generated content within the summary portal page In yet another embodiment, a computer program product for creating a portal page summarizing previous portal page usage comprises one or more computer-readable tangible storage devices. The computer program product comprises program instructions, stored on at least one of the one or more storage devices, to store detected usage of at least one instance of at least one portlet application within at least one portal page separately at each of a plurality of different times. The computer program product comprises program instructions, stored on at least one of the one or more storage devices, to dynamically generate content for each of the at least one instance of the at least one portlet application based on a first data option selected from among a plurality of data options selectable within the at least one portlet application from a first selection of separate data accesses to at least one data storage system delivering a first selection of data for each at least one portlet application; The computer program product comprises program instructions, stored on at least one of the one or more storage devices, to store the detected usage of the at least one instance of the at least one portlet application by storing the dynamically generated content for each of the at least one instance of the at least one portlet application and the first data option. The computer program product comprises program instructions, stored on at least one of the one or more storage devices, to dynamically create a summary portal page displaying a separate instance of the at least one portlet application for at least one of each of the plurality of different times specified according to the detected usage separately stored at each of the plurality of different times. The computer program product comprises program instructions, stored on at least one of the one or more storage devices, responsive to a user selection to generate the summary portal page, to dynamically create the summary portal page displaying at least one first instance of the at least one portlet application specified according to the stored detected usage comprising the dynamically generated content and displaying a second instance of the at least one portlet application specified with a second selection of dynamically generated content generated based on the first data option in the detected usage from a current data access to the at least one data storage system delivering the second selection of data different from the first selection of data and not previously stored in the detected usage. The computer program product comprises program instructions, stored on at least one of the one or more storage devices, responsive to detecting the dynamically generated content from the current data access, to graphically distinguish second selection of dynamically generated content from the dynamically generated content to visually distinguish the second selection of dynamically generated content from the dynamically generated content within the summary portal page.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a block diagram illustrating one example of layers of a portal for supporting portlets and a portal summary controller for monitoring portal usage and creating a portal page including a configurable summary of the monitored portal usage;

FIG. 2 is a block diagram depicting one example of a network environment for supporting network based portals in which the present invention may be implemented;

FIG. 3 is a block diagram illustrating one embodiment of a computer system in which the present invention may be implemented;

DETAILED DESCRIPTION OF THE PREFERRED EMBODIMENT

Figure 4:
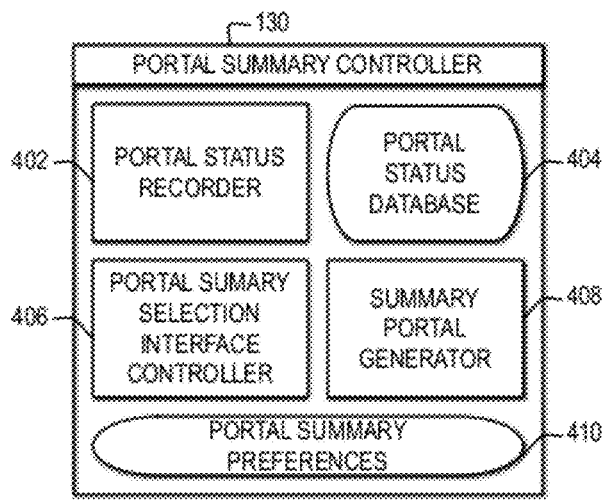
FIG. 4 is a block diagram depicting examples of components of a portal summary controller.

Referring now to FIG. 1, a block diagram illustrates one example of layers of a portal for supporting portlets and a portal summary controller for monitoring portal usage and creating a portal page including a configurable summary of the monitored portal usage. It will be understood that the layers displayed may include additional or alternate layers for implementing the functions described or for implementing additional or alternate functions. In addition, it will be understood that the layers displayed may be distributed across a single computing system or multiple computer systems communicatively connected temporarily or permanently across a network or other connection medium.

In the example, portal layers 100 include a portal application layer 112. Portal application layer 112 includes at least one web application or represents at least one web service for aggregating different applications and controlling a presentation layer for the aggregated applications in the form of a portal page. In particular, in the example, each of portlets 104, 106, and 108 within a portlet layer 102 represent applications which portal application layer 112 may aggregate and control the presentation of instances of the aggregated portlets in a single portal page. In one example, portlets 104, 106, and 108 generate dynamic content called fragments, which are pieces of markup language, such as Hypertext Markup Language (HTML), extensible markup language (XML), or voice XML. The fragments may include data for display or other types of output including, but not limited to, text, graphics, audio, and video. Portal application layer 112 controls presentation of the fragments according to the positioning of the associated portlet instances within the portal page.

In addition, portal application layer 112 facilitates personalization of portal pages. For example, portal application layer 112 facilitates user selection of which portlet instances, such as instances of portlets 104, 106, and 108, to place within a portal page and facilitates user placement of the portlet instances at specific positions within the portal page. In addition, portal application 112 may control a customized appearance of the portal page and the portlet instances displayed within the portal page.

Further, portal application layer 112 may provide for authentication of a user to access the aggregated applications in a portal page through a single authentication process. Once a user is authenticated by portal application layer 112, portal application 112 may handle authentication of the user as required by other systems and other layers.

In addition, portal application layer 112 interfaces with a network layer 114 which enables communication with and accesses data from one or more data sources, such as data sources 122, 124, and 126, in a data sources layer 120. In addition, it is important to note that a container layer 110 or portlet layer 102 may interface directly with network layer 114 to access data sources layer 120.

Portlets 104, 106, and 108 are individual web applications or components, instances of which are made accessible to users via a portal page supported by portal application layer 112. In one example, a single portlet, such as any one of portlets 104, 106, and 108, dynamically generates a fragment of the markup that a user views in a portal page which includes one or more instances of the portlet.

Container layer 110 may provide the runtime environment to portlets 104, 106, and 108. For example, users make requests from portlet instances displayed in a portal page and portal application layer 112 forwards the requests to container layer 110. Container layer 110 then distributes the request to the appropriate portlet. In addition, for example, once the portlet dynamically generates the content fragment for the portlet, container layer 110 sends the fragment to portal application layer 112 for display within a portal page. Further, container layer 110 may store portlet preferences for a user and provide additional functions for supporting customized portlet access by a user. It is important to note that while container layer 110 and portlet layer 102 are illustrated as separate layers, the layers may only be virtually represented as separate layers and physically may be part of a same component. In addition, it is important to note that container layer 110 may provide a runtime environment and support for components other than portlets, such as servlets.

In one example, portal layers 100 may include one or more layers written to or implemented under standards which facilitate reusability across multiple types of enterprise systems and other computer systems provided by one or more vendors or developers. In one example, portal application layer 112 may implement a Java 2 Enterprise Edition (J2EE) (Java is a registered trademark of Sun Microsystems Inc.) complaint portal application that is able to run atop one or more different operating systems and process requests from multiple client systems in an enterprise network of computer systems. Portal application layer 112 may call container layer 110 through a container application programming interface (API) to which container layer 110 is specified, where the container API may be reusable across multiple J2EE compliant portal applications or portal applications compliant with other standards. Container layer 110 may call portlets in portlet layer 102 through a portlet API, such as the portlet API standardized according to the Java Portlet Specification. One or more portlets within portlet layer 102 may be created according to the Java Portlet API or other specifications designed for reusability across platforms. In addition, it is important to note that portal application layer 112 may support portal applications written to additional, alternate, or different specifications which run atop an operating system, container layer 110 may support multiple containers written to additional, alternate, or different specifications which portal application layer 112 calls through different container APIs, and portlet layer 102 may support portlets written to additional, alternate, or different portlet standards which container 110 calls through different portlet APIs.

In the example, portal application layer 112 interfaces with a network layer 114 which may include one or more network architecture layers for supporting network requests from and responses to portal application layer 112, container layer 110 and portlet layer 102. In particular, in the example, network layer 114 interfaces with a data source layer 120 that includes one or more data sources illustrated as data sources 122, 124, and 126. Data sources 122, 124, and 126 may represent server systems which store data, databases, and other data storage mediums which are accessible via network layer 114.

In one example, portlets 104, 106, and 108 are database driven portlets and the database data that drives portlets 104, 106, and 108 is accessed from data sources layer 120. As database driven portlets, portlets 104, 106, and 108 support at least one data option available for access from at least one of data sources 122, 124, and 126. Container layer 110 may receive changes to the data option selected within the portal page from portal application layer 112, store the current data option preference and pass the currently selected data option to the appropriate one of portlets 104, 106, and 108. Portlets 104, 106, and 108 request data from data source layer 120, such as from one of data sources 122, 124, and 126, via network layer 114. Portlets 104, 106, and 108 receive the data accessed from at least one of data sources 122, 124, and 126 and generate dynamic content called fragments, which are pieces of markup language, such as Hypertext Markup Language (HTML), extensible markup language (XML), or voice XML, from the transferred data. In addition, or alternatively, data sources 122, 124, and 126 may generate and pass dynamic content to requesting portlets 104, 106, and 108. Portal application layer 112 controls generation of a portal page displaying the fragments dynamically generated or received by portlets 104, 106, and 108.

It is important to note that multiple portlets, such as portlets 104 and 106 may represent a same database driven application, where each of portlets 104 and 106 is set to access a different data option and represents a different instance of the database driven application specified for a portal page. A same data source within data source layer 120 may maintain the data associated with multiple data options of a portlet or different data sources may separately maintain the data associated with each of the multiple data options.

According to an advantage of the present invention, layers 100 may include a portal summary controller 130. In the example, portal application layer 112 includes portal summary controller 130. Functions of portal application layer 112 may also be implemented within container layer 110 and portlet layer 102 or may access data from container layer 110 and portlet layer 102. In other embodiments, additional, alternate, or multiple layers may implement portal summary controller 130.

Portal summary controller 130 monitors usage of one or more portal pages created by portal application layer 112 and stores the usage with a timestamp and other available information. Portal page usage may include, but is not limited to, which portlets are currently placed within a portal page, which data options are selected in the database driven portlets, and what content is dynamically generated by each portlet and displayed within the instance of the portlet within the portal page. Portal summary controller 130 may capture current portal usage each time a change in portal usage is detected, periodically, or responsive to a user direction to cache the current portal usage. Subsequent to monitoring and storing portal usage, portal summary controller 130 provides a configurable summary of the stored portal usage in a summary portal page displaying portlet instances specified according to the stored portal usage.

With reference now to FIG. 2, a block diagram illustrates one example a network environment for supporting network based portals in which the present invention may be implemented. It is important to note that network environment 200 is illustrative of one type of network environment which may support one or more layers of portal layers 100, however, the method, system, and program described with reference to portal layers 100 may be implemented in other network environments. In addition, it is important to note that the distribution of systems within network environment 200 is illustrative of a distribution of systems, however, other distributions of systems within a network environment may be implemented.

As illustrated, multiple systems within network environment 200 may be communicatively connected via network 202, which is the medium used to provide communications links between various devices and computer systems communicatively connected. Network 202 may include permanent connections such as wire or fiber optics cables and temporary connections made through telephone connections and wireless transmission connections, for example. Network 202 may represent one or more of packet-switching based networks and telephony based networks, local area and wide area networks, public and private networks.

When represented within network layer 114, network 202 may represent one or more layers of a network protocol stack which includes one or more of a physical layer, a link layer, a network layer, a transport layer, a presentation layer, and an application layer. Network layer 114 may implement, for communications between systems across network 202, multiple types of network protocol stacks. For example, network layer 114 may implement one or more of the Transmission Control Protocol/Internet Protocol (TCP/IP) protocol stack or an Open Systems Interconnection (OSI) protocol stack. In addition, for example, network 202 may represent the worldwide collection of networks and gateways that use the TCP/IP suite of protocols to communicate with one another.

Network environment 200 may implement multiple types of network architectures. In one example, network environment 200 may be implemented using a client/server architecture, where computing systems requesting data or processes are referred to as clients and computing systems processing data requests and processes are referred to as servers. In another example, network environment 200 may be implemented in a peer-to-peer network architecture. In yet another example, network environment 200 may be implemented in a grid architecture. It will be understood that other types of network architectures and combinations of network architectures may be implemented.

In the embodiment, as illustrated, client systems 210 and 212 are communicatively connected via network 202 to one or more of a portal server system 218 and data server systems 214 and 216. Client systems 210 and 212 are representative of one or more client systems at which portal pages are accessed and displayed through output interfaces and data server systems 214 and 216 are representative of servers which serve as data sources for providing data to portlets. In additional or alternate embodiments, additional or alternate client systems and data server systems may be implemented.

In one example, client systems 210 and 212 may implement portal application layer 112, container layer 110, and portlet layer 102 and access data for portlets from one of data server systems 214 and 216. Portal summary controller 130 may store the current contents of portlets locally at client system 210 or 212 and generate a summary portal page from locally stored portal usage.

In another example, a portal server system 218 may implement portal application layer 112, container layer 110 and portlet layer 102 and a local browser on client system 210 or 212 controls display of a portal page created by portal server system 218 and passes user interaction within the portal page to portal server system 218. Portal summary controller 130 may store portal usage at portal server system 218 and generate a summary portal page for display at one of client systems 210 or 212 with portlets specified from the portal usage stored by portal server system 218.

In yet another example, each of client system 210, client system 212, and portal server system 218 may implement one or more of portal application layer 112, container layer 110 and portlet layer 102. In addition, as previously noted, client system 210 and client system 212 may run additional application software, such as a browser or other application in which portal pages may be viewed and which returns user interactions with portal pages to portal application layer 112.

In addition, in other examples, portal server system 218 may represent an enterprise server system for providing client systems, such as client systems 210 and 212, access to network 202. Portal server system 218 may implement Websphere (Websphere is a registered trademark of International Business Machines Corporation) applications or other enterprise server applications for controlling portal page delivery, portal summary page delivery, and network access for multiple client systems.

Referring now to FIG. 3, a block diagram depicts one embodiment of a computer system in which the present invention may be implemented. The controllers and systems of the present invention may be executed in a variety of systems, including a variety of computing systems, such as computer system 300, communicatively connected to a network, such as network 302.

Computer system 300 includes a bus 322 or other communication device for communicating information within computer system 300, and at least one processing device such as processor 312, coupled to bus 322 for processing information. Bus 322 includes low-latency and higher latency paths that are connected by bridges and adapters and controlled within computer system 300 by multiple bus controllers. When implemented as a server, computer system 300 may include multiple processors designed to improve network servicing power. Where multiple processors share bus 322, an additional controller (not depicted) for managing bus access and locks may be implemented.

Processor 312 may be a general-purpose processor such as IBM's PowerPC™ processor that, during normal operation, processes data under the control of an operating system 360, application software 370, middleware (not depicted), and other code accessible from a dynamic storage device such as random access memory (RAM) 314, a static storage device such as Read Only Memory (ROM) 316, a data storage device, such as mass storage device 318, or other data storage medium. Application software 370 may include software for one or more of portal application layer 112, container layer 110 and portlet layer 102, described in FIG. 1. In addition, application software 370 may include software for controlling a data source, such as a database, implementing data source layer 120. Further, application software 370 or middleware may implement one or more types of enterprise software, such as Websphere (Websphere is a registered trademark of International Business Machines Corporation) software, such as for running a Websphere application server.

In one embodiment, the operations performed by processor 312 may control monitoring portal usage, recording and storing the monitored portal usage, and subsequently, creating a summary portal page configurable to display all or a portion of the stored portal usage, as described in the operations of the flowcharts of FIGS. 8-10 and other operations described herein. Operations performed by processor 312 may be requested by operating system 360, application software 370, middleware or other code or the steps of the present invention might be performed by specific hardware components that contain hardwired logic for performing the steps, or by any combination of programmed computer components and custom hardware components.

The present invention may be provided as a computer program product, included on a computer readable tangible or machine-readable medium having stored thereon the executable instructions of a computer-readable program that when executed on computer system 300 cause computer system 300 to perform a process according to the present invention. The terms "computer-readable tangible medium" or "machine-readable medium" as used herein is a medium that participates in providing instructions to processor 312 or other components of computer system 300 for execution. Such a medium takes the form of storage type media, such as non-volatile media and volatile media. Non-volatile media include, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 300 can read and which stores instructions. In the present embodiment, an example of a non-volatile medium is mass storage device 318, which as depicted is an internal component of computer system 300, but will be understood to also be provided by an external device. Volatile media include dynamic memory such as RAM 314.

Moreover, the present invention may be downloaded or distributed as a computer program product, wherein the computer-readable program instructions may be transmitted from a remote computer such as a server 340 to requesting computer system 300 via network 202 to a network link 334 (e.g. a modem or network connection) to a communications interface 332 coupled to bus 322. In one example, where processor 312 includes multiple processor elements, then a processing task distributed among the processor elements, whether locally or via a network, may represent a computer program product, where the processing task includes program instructions for performing a process or program instructions for accessing Java (Java is a registered trademark of Sun Microsystems, Inc.) objects or other executables for performing a process. Communications interface 332 provides a two-way data communications coupling to network link 334 that may be connected, for example, to a local area network (LAN), wide area network (WAN), or directly to an Internet Service Provider (ISP). In particular, network link 334 may provide wired and/or wireless network communications to one or more networks, such as network 202. Further, although not depicted, communication interface 332 may include software, such as device drivers, hardware, such as adapters, and other controllers that enable communication. When implemented as a server, computer system 300 may include multiple communication interfaces accessible via multiple peripheral component interconnect (PCI) bus bridges connected to an input/output controller, for example. In this manner, computer system 300 allows connections to multiple clients via multiple separate ports and each port may also support multiple connections to multiple clients.

Network link 334 and network 202 both use electrical, electromagnetic, or optical signals that carry digital data streams. The signals through the various networks and the signals on network link 334 and through communication interface 332, which carry the digital data to and from computer system 300, may be forms of carrier waves transporting the information.

In addition, computer system 300 may include multiple peripheral components that facilitate input and output. These peripheral components are connected to multiple controllers, adapters, and expansion slots, such as input/output (I/O) interface 326, coupled to one of the multiple levels of bus 322. Input device 324 may include, for example, a microphone, a video capture device, a body scanning system, a keyboard, a mouse, or other input peripheral device, communicatively enabled on bus 322 via I/O interface 326 controlling inputs. In addition, an output device 320 communicatively enabled on bus 322 via I/O interface 326 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 3 may vary. Furthermore, those of ordinary skill in the art will appreciate that the depicted example is not meant to imply architectural limitations with respect to the present invention. For example, computer system 300 may also be a tablet computer, laptop computer, or telephone device.

With reference now to FIG. 4, a block diagram illustrates examples of components of a portal summary controller. It will be understood that in additional or alternate embodiments, the portal summary controller may include additional or alternate components.

In the example, portal summary controller 130 includes a portal status recorder 402. Portal status recorder 402 monitors the usage of one or more portal pages and records and stores portal usage with a time stamp and other available information in a portal status database 404. As previously noted, portal usage may include, but is not limited to, which portlet instances are open within a portal page, the selected data options for open database driven portlets, and the dynamically generated content of portlet instances within a portal page. It is important to note that dynamically generated content may include, but is not limited to, text, graphics, audio, video and streaming multimedia content.

In one example, as portal status recorder 402 records and stores portal usage records within portal status database 404, to indicate when portal usage is recorded, portal status recorder 402 may adjust a graphical characteristic or other output characteristic of individual portlet instances within a portal page or may adjust a graphical characteristic or other output characteristic within the portal page itself. For example, each time portal status recorder 402 records the portal usage for a portal page, portal status recorder 402 may add a time stamp to a portion of the portal page indicating when the portal usage was recorded and stored for the portal page. In another example, each time portal status recorder 402 records the portal usage for a portal page, portal status recorder 402 may temporarily adjust a graphical attribute or characteristic of the portal page or an individual portlet instance within the portal page, such as by adding shading or adjusting a coloring of a portal page or individual portlet instance within the portal page. In yet another example, where portal status recorder 402 monitors portal usage within multiple portal pages, portal status recorder 402 may simultaneously update a graphical characteristic of each of the monitored portal pages or graphically distinguish a selection of recorded portal pages from at least one portal page for which usage is not recorded.

In monitoring usage of one or more portal pages, portal status recorder 402 determines when to record and store portal usage within portal status database 404. In one example, portal status recorder 402 records each change in portal usage detected, such as recording each change in the portlets selected for view within a portal page, each change in the data option selected for a portlet instance, and each change in the dynamically generated content of a portlet instance within a portal page. In another example, portal status recorder 402 may support an application program interface to include a selectable option within one or more portlet instances or within a portal page that allows a user to select an option to direct portal status recorder 402 to record and store the current usage of a particular portlet instance or portal page as a whole. In yet another example, portal status recorder 402 may determine when to record and store portal usage in portal status database 404 based on recording settings in portal summary preferences 410. For example, portal summary preferences 410 may specify recording settings for recording and storing the portal usage periodically, according to calendared events set for the portal or in a separate calendaring application, according to the type of portlet, and according to other criteria or rules.

Portal summary controller 130 also includes a portal summary selection interface controller 406. In one example, portal summary selection interface controller 406 provides an interface with a list or other selectable representation of one or more records representing portal usage recorded in portal status database 404. A user, selecting from the list, may customize or configure those records of portal usage for summary portal generator 408 to include in a summary portal page. In another example, portal summary selection interface controller 406 may include selectable options within an interface for a user to select a particular portlet and select a time period over which to display all the portal usage for the particular portlet stored in portal status database 404 within a summary portal page generated by summary portal generator 408. Further, in another example, portal summary selection interface controller 406 may include selectable options within an interface for a user to select to automatically direct summary portal generator 408 to create a portal page for all or a selection of portal usage contemporaneously with the recording of the portal usage within portal status database 404.

In addition to a user directly selecting which selection of portal usage stored in portal status database 404 to include in a summary portal page, portal summary preferences 410 may specify preferences for specifying the selection of portal usage stored in portal status database 404 for summary portal generator 408 to include in a summary portal page. In one example, portal summary preferences 410 may indicate a preference to automatically generate a summary portal page for each record of portal usage recorded in portal status database 404. In another example, portal summary preferences 410 may indicate a preference to automatically generate a summary portal page on the morning of each business quarter including a separate portlet instance of a particular portlet application for each of the previously recorded business quarters with each portlet instance displaying the content stored for the portlet application at the end of the current quarter or one of the previous quarters.

In creating a summary portal page, summary portal generator 408 may create a portal page which may include at least one portlet instance of at least one portlet application which functions as if placed on a normal portal page with the data options for database driven portlets specified according to the data options for the portlets specified at a previous point in time as accessed from portal status database 404. Based on the previously specified data options, the portlet instance in a summary portal page displays dynamically generated content for the portlet based on the current data for the previously selected data option.

In addition, in creating a summary portal page, summary portal generator 408 may create a summary portal page in which portlet instances may function as if placed on a normal portal page, however the content of the portlet instance is specified with the content previously displayed within the portlet instance of a same portlet application at a previous point in time as accessed from portal status database 404. In this example, the summary portal page may include multiple portlet instances each specified with content accessed from portal status database 404 as recorded at a same point in time or different points in time.

Further, in creating a summary portal page, summary portal generator 408 may create a summary portal page which includes portlet instances for those portlet applications recorded as placed within a portal page over a particular time period within portal status database 404, with a default data option selected. In this example, in addition to allowing a user to specify the portlet instances open within a portal page, the user may store time based recordings of which portlet instances were open within a portal page at different points in time and access a summary portal page with the portlet instances open at one of the different points in time as recorded in portal status database 404.

Moreover, in creating a summary portal page, summary portal generator 408 may direct a portal application within portal application layer 112 to create the summary portal page with a selection of one or more portlets and one or more of a selection of data options set for the portlets and a selection of stored content to display in the portlets. In addition or alternatively, summary portal generator 408 may create a portal page separately from the portal application within portal application layer 112 with the selection of one or more portlet instances and one or more of a selection of data options set for the portlet instances and a selection of stored content from portal summary preferences 410 to display in the portlet instances.

In one example, summary portal generator 408 creates a summary portal page within a separate window. In another example, summary portal generator 408 creates the summary portal page within an interface which adds a new tab to support a new portal page and summary portal generator 408 places the summary portal page within the tab.

Further, in creating a summary portal page, summary portal generator 408 may graphically distinguish the portions of the content displayed within the summary portal page which are based on records from portal status database 404 from the portions of the content displayed within the summary portal page which are based on current data accesses. In addition, as a user interacts with the summary portal page, the user may change data option selections within one or more portal instances and summary portal generator 408 specifies user selected changes according to the same graphical characteristic used to distinguish current data accesses. For example, portions of the content displayed within the summary portal page based on records from portal status database 404 may be highlighted with a distinguishable color, texture, hue, or other graphical indicator which facilitates visual distinction of content based on records from portal status database 404 from the other content displayed within the summary portal page.

It is important to note that portal status database 404 may be stored at a client system, such as one of client systems 210 or 212, or at a portal server system, such as portal server system 218. In the example where portal usage is stored at a client system, portal status database 404 may represent a database within memory or may represent data stored with cache. In addition, separate storage systems for storing portal usage may be accessible to client systems or portal server systems via network 202.

In one example, where portal usage is stored at a client system, portal status recorder 402 may store data points within portal status database 404 and a rich client portal application running at the client system renders portlets locally from the data points for output within a summary portal page managed by summary portal generator 408. In addition, in the example where portal usage is stored at a client system, portal status recorder 402 may store HTML fragments, as previously described, within portal status database 404 and a rich client portal application renders portlets locally from the HTML fragments by running a file server portlet that allows display of HTML content. In yet another example, where portal usage is stored at a client system, portal status recorder 402 may capture and store static snapshot images of a portlet instance and summary portal generator 408 generates HTML from the snapshot for rendering through a rich client portal application running a file server portlet that allows display of HTML content.

In the example, where portal usage is stored in portal status database 404 at a portal server system, portal status recorder 402 may record into portal status database 404 data points, HTML, or static snapshot images, as described with reference to locally storing portal usage. Portal summary preferences 410 or other preferences within one or more of the layers of portal layers 100 are set to point to portal status database 404 at the portal server system. The portal server system renders the content for display in the portlet instances in a summary portal page from the stored data points, HTML or static snapshot images.

In addition, it is important to note that while the invention is described with reference to summary portal generator 408 accessing portal status database 404 to generate summary portal pages, other controllers or functions may access portal status database 404. For example, when a user is offline or not able to access a data server system for a portlet, portlet applications may access previously accessed and stored content from portal status database 404, and dynamically generate content for display within portlet instances while offline or not able to access a data server system for a portlet.

Figure 5:
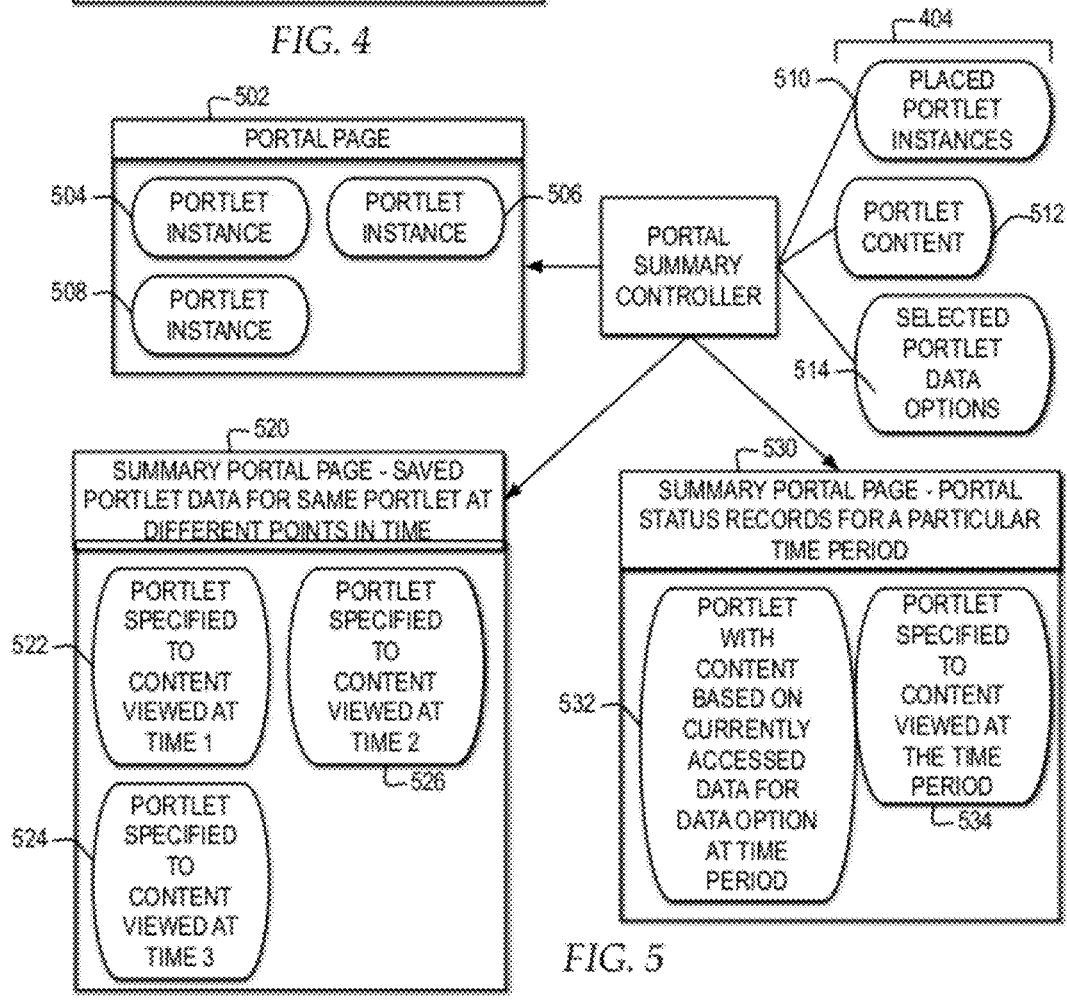
FIG. 5 is a block diagram illustrating examples of portlet instances specified according to recorded portal usage within summary portal pages.

With reference now to FIG. 5, a block diagram illustrates examples of portlet instances specified according to recorded portal usage within summary portal pages. In the example, portal summary controller 130 monitors portal usage of a portal page 502 which includes portlet instances 504, 506, and 508. Portlet instances 504, 506, and 508 may represent instances of a same portlet application or different portlet applications. In addition, at least one of portlet instances 504, 506, and 508 represents an instance of a database driven portlet.

In the example, portal summary controller 130 detects and stores, at one or more points in time, within portal status database 404, the portal instances open within portal page 502 as illustrated at reference numeral 510, the portlet content within at least one portlet within portal page 502 as illustrated at reference numeral 512, and the selected portlet options within at least one portlet within portal page 502 as illustrated at reference numeral 514. In addition, although not depicted, portal summary controller 130 may detect and store portal usage from other portal pages in portal status database 404.

In one example, portal summary controller 130 generates a portal summary page of the saved portlet content for a same portlet application over multiple points in time. For example, portlet content 512 may store the portlet content for a financial portlet each month. Summary portal page 520 includes multiple instances of the financial portlet illustrated by portlet instances 522, 524, and 526. Each of the portlet instances includes the content saved for one of the previous months in the financial portlet instances displayed within portal page 502 or other portal pages. Thus, a user may select to view a summary of multiple instances of a same portlet application with the content displayed for that portlet at different points in time.

In another example, portal summary controller 130 generates a portal summary page 530 of the portlets accessed at one or different times during a particular time period. In the example, portal summary page 530 includes instances of each of the portlets recorded as placed within portal page 520 at a particular point in time. For portlet instance 532, the portlet instance is set to access the content currently available for the data option selected at the particular time period. For portlet instances 534, the portlet instance is set to display the content stored for the portlet at the particular time period. Thus, a user may select to view a summary of instances of portlets placed in a portal page at a particular time and either access current content for the data option selected at the point in time or access the content that was displayed in the portlet at the point in time.

Figure 6:
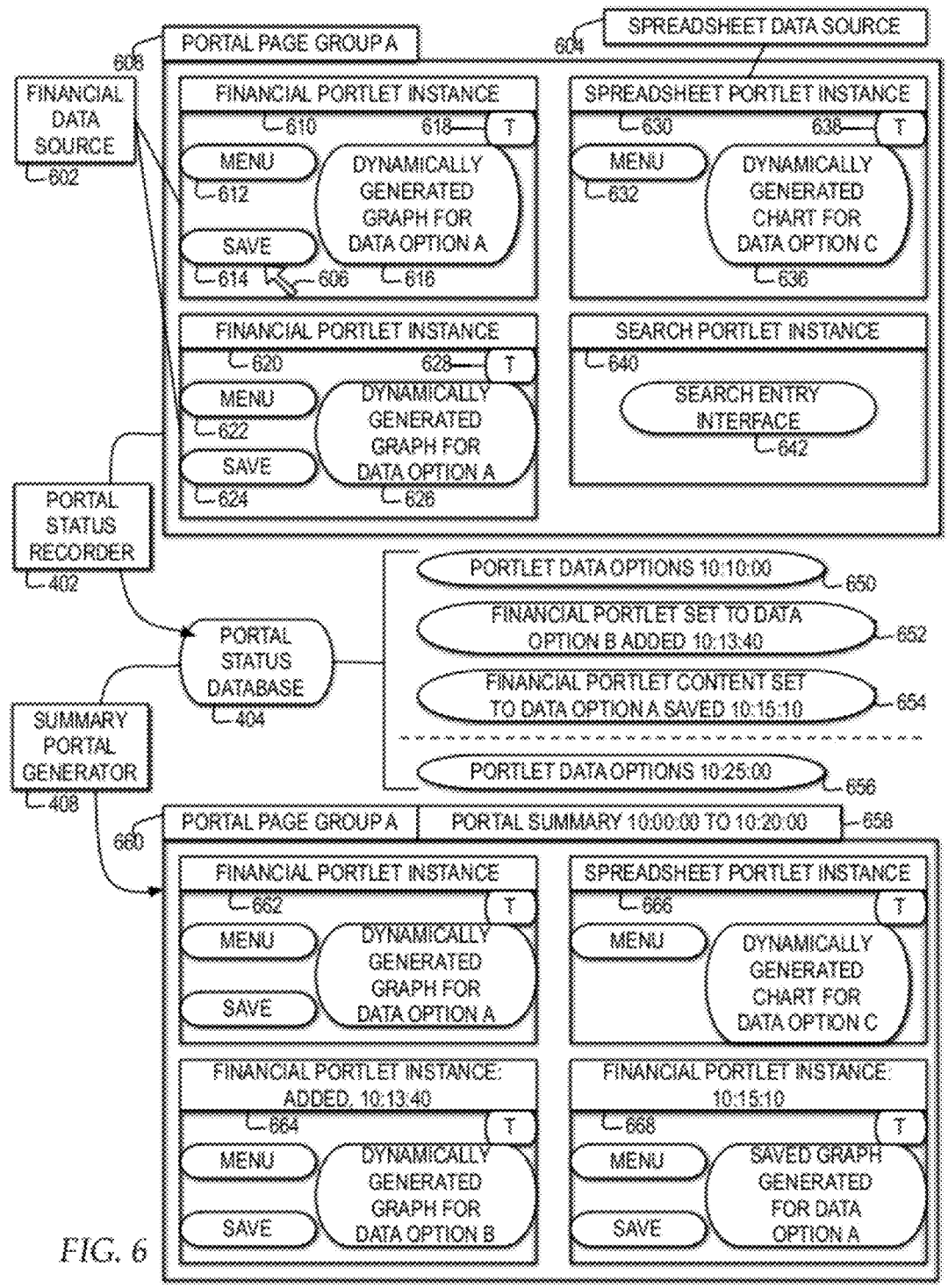
FIG. 6 is a block diagram depicting one example of a portal summary page for portal usage over a particular time period.

Referring now to FIG. 6, a block diagram illustrates one example of a portal summary page for portal usage at different times over a particular time period. In the example, within a first portal page displayed within an interface that facilitates tabbed windows for rendering portal pages, a first "portal page group A" is illustrated as depicted at reference numeral 608. The portal page illustrated for the tab depicted at reference numeral 608 includes financial portlet instances 610 and 620, a spreadsheet portlet instance 630 and a search portlet 640. Each of financial portlet instances 610 and 620 and spreadsheet portlet instance 630 are instances of database driven portlets and include a menu of selectable data options, respectively illustrated at reference numerals 612, 622, and 632. In alternate embodiments, additional or alternate types of selection interfaces from the menu selections may be implemented. For example, data options may be selectable from multiple selectable words or links displayed within a portlet instance.

In the example, those portlet instances which are recordable according to user preferences are marked with a graphical indicator as illustrated by graphical indicators 618, 628, and 638. Portal summary preferences 410, for example, may specify that only those portlets which are database driven and therefore include dynamically generated content, are to be monitored and the usage of stored. In the example, portlet instances 610, 620, and 630 are instances of database driven portlets which dynamically generate content based on the current data specified for a selected data option. In contrast, a search portlet instance 640 with a search entry interface 642 into which a user may enter any term is not an instance of a database driven portlet and is not marked as being recorded.

In other embodiments, usage of portlets that are not database driven, such as search portlet 640, may be recorded. In addition, in other embodiments, graphical indicator 618, 628, and 638 or separate graphical indicators may be updated within portlet instances to indicate the usage of the portlet instance has been saved.

In the example, portal status recorder 402 records the portal usage within the portal page as illustrated with reference to multiple records of portal status database 404. Portal status recorder 402 may determine from portal summary preferences 410, user inputs, and other specifications, which portal usage to record.

For example, portal status recorder 402 is directed to periodically record the currently selected portlet data options. In the example, the period is every fifteen minutes, as illustrated by record 650 recorded at 10:10:00 and record 656 recorded at 10:25:00. Although not depicted, in each of record 650 and record 656, the current data options selected within the placed, recordable portlets, are recorded.

In addition, for example, portal status recorder 402 is directed to record each time a portlet instance is added to a portal page or withdrawn from a portal page. In the example, when financial portlet instance 620 is added to the portal page, record 652 records the time the portlet instance was added and the data option of "option B" selected within the portlet instance.

Further, for example, portal status recorder 402 is directed to record the content within portlet instance 610 responsive to the user selection of save option 614 using cursor 606. As illustrated within portlet instances 610 and 620, save options 614 and 624 allow a user to select to save the contents of each of these portlet instances individually. In the example, when the user selects to save the content of portlet instance 610 within portal status database 404 or another database that the user selects, record 654 within the selected database includes an identifier for portlet instance 610, the time of saving the content, the content itself, and the data option selected within portlet instance 610.

Subsequent to portal status recorder 402 storing records of portal usage in portal status database 404, a user may request to view a summary of portal usage at different points during a range of time. In the example, the user selects to view a summary of portal usage during a time range from 10:00:00 to 10:20:00. Records 650, 652, and 654 are relevant to the search period range.

As illustrated, summary portal generator 408 generates a new summary portal page 658 within the display area. Using cursor 606, a user may select between portal page 608 and summary portal page 658 by selecting one of the tabs within a tab interface 660. In additional or alternate examples, summary portal generator 408 may open a separate window for displaying summary portal page 658. In addition, in additional or alternate examples, summary portal generator 408 may open summary portal page 658 within the browser or other interface at the client system where the client system interface specifies the interface for selecting between multiple portal pages.

In particular, summary portal generator 408 generates summary portal page 658 with a first selection of portlet instances representative of the portlets placed within portal page and the data options selected for those portlets, as recorded in record 650. For example, summary portal page 658 includes financial portlet instance 662, financial portlet instance 664, and spreadsheet portlet instance 666 which are set to "option A", "option B", and "option C", respectively, reflective of the portlet placement and data option selections at 10:10:00 when portal status recorder 402 recorded the portal usage in record 650 and reflective of the portlet addition at 10:13:40 when portal status recorder 402 recorded the portal usage in record 652. Each of financial portlet instance 662, financial portlet instance 664, and spreadsheet portlet instance 666 include the current, dynamically generated content for the data option selections recorded in record 650 of "option A", "option B", and "option C", respectively.

In addition, summary portal generator 408 generates summary portal page 658 with a second selection of portlet instances displaying the content recorded in record 654. For example, summary portal page 658 includes financial portlet instance 668 which includes the saved content for data option A, reflective of the portlet instance content at 10:15:10 when portal status recorder 402 recorded the portal usage in recorder 654.

In the examples of records 650, 652, 654, and 656, stored within portal status database 404 or one or more other databases selected by a user or portal summary controller, additional or alternate data that is available or analyzed may be stored with each of the records and displayed in the summary. For example, a record may include content of a portlet and a summary of the stored content.

In addition, in the example of summary portal page 658, in other examples, the user may select or summary portal generator 408 may automatically generate a summary portal page reflective of only particular types of portal usage records. For example, summary portal page may only reflect recorders with portlet placement and data options selected or may only reflect records with portlet content stored.

Further, it is important to note that in another example, the summary portal page may be generated at a particular point in time and then be set for summary portal generator 408 to automatically update summary portal page each time portal status recorder 402 records a new record in portal status database 404.

Figure 7:
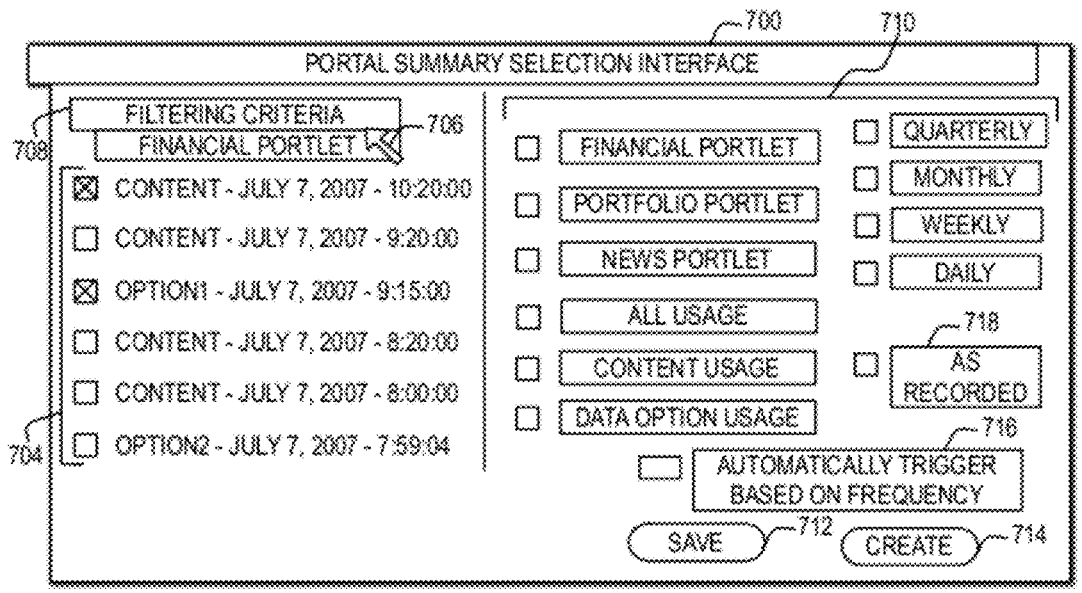
FIG. 7 is a block diagram illustrating one example of a portal summary selection interface through which a user may select the portal usage to apply when specifying portlet instances within a summary portal page.

With reference now to FIG. 7, a block diagram illustrates one example of a portal summary selection interface through which a user may select the portal usage to apply when specifying portlet instances within a summary portal page. In the example of a portal summary selection interface 700 facilitated by portal summary selection interface controller 406, a user may select from a list of records of portal usage stored in portal status database 404, as illustrated in the list at reference numeral 704. In particular, as illustrated in the example, the user may first select to view a filtered selection of the records of portal usage stored in portal status database 404 by selecting a filtering criteria from a pull down menu 708 using a cursor 706 or other input which enables selection from a pull down list. In the example, a user has selected to view all records within portal status database 404, which include instances of a financial portlet. As illustrated, the examples of selectable records within portal status database 404, which include instances of a financial portlet, include time based records of saved content for the financial portlet and saved option selections for the financial portlet. From among the filtered list illustrated at reference numeral 704 a user may further select which of the records to include within a summary portal page by individually selecting records using cursor 706 or other type of input option that enables selection from the list of records.

While the example illustrates the list of portal usage from portal status database 404 filtered according to a type of portlet, in other example, a user may select other filtering criteria such as a time range, whether the record is for content, whether the record is for an option, whether the record indicates the portlets opened at a particular time, and other criteria which distinguish a selection of records from among portal status database 404. In addition, while the example illustrates pull down menu 708 as providing the selectable options for filtering records from portal status database 404, in other examples, portal summary selection interface controller 406 may implement other types of interfaces through which a user may select filtering criteria.

In addition, in the example of portal summary selection interface 700, in addition to or as an alternative to selecting from the list at reference numeral 704, portal summary selection interface controller 406 may include options for specifying the types or categories of records to include within the portal summary page. In the example, as illustrated at reference numeral 710, a user may select from options include types of portlet instances, such as "financial portlets", "portfolio portlets", and "news portlets", frequency of portlet usage, such as "quarterly", "monthly", "weekly", or "daily", and may select whether to record all portal usage, content usage or data option usage. It will be understood that the category examples depicted at reference numeral 710 are for purpose of illustration of the types of options portal summary selection interface controller 406 may present within portal summary selection interface 700 and are not limiting on the types or formats of criteria a user is enabled to select from to specify the recorded portal usage to include within a summary portal page.

In particular, a user may also select an "as recorded" option 718 to add portlet instances reflecting all or selected types of records within portal status database 404 as the records are recorded by portal status recorder 402 and stored in portal status database 404. In one example, a user may select to open a summary portal page which will provide a summary of each of the portlet content changes throughout a session, by selecting the "content usage" option and option 718 within portal summary selection interface 700. By updating the summary portal page as the content changes within one or more other portal pages, the user may switch to view the summary portal page and view a record of previously displayed dynamic content over a particular time period.

In the example, a user may select a save option 712 to select to save selected options for specifying the portlet instances within a summary portal page. In addition, upon choosing the save option depicted at reference numeral 712, portal summary selection interface controller 406 may prompt the user to name the selected options for the summary portal page and portal summary selection interface controller 406 saves the selected options as a file or other data storage unit.

Through portal summary selection interface 700, a user may select options for multiple separate summary portal pages and may select to open separate summary portal pages by selecting to open one or more of the saved option files. For example, as illustrated, the user selects to save options for a summary portal page specified for the portal usage of the content of a financial portlet on "Jul. 7, 2007" at "10:20:00" and of a financial portlet instance set to data "option 1" on "Jul. 7, 2007" at "9:15:00." The user may later select the saved option file to trigger summary portal generator 408 to create a summary portal page with portlet instances specified according to the saved records.

In addition, a user may select options for a summary portal page within portal summary selection interface 700 and select to create the summary portal page through selection of the create option depicted at reference numeral 714. When the user selects the create option illustrated at reference numeral 714, summary portal generator 408 detects the applicable records from portal status database 404 designated by the user selected options and generates a summary portal page including portlet instances specified according to the applicable records.

In addition, through portal summary selection interface 700, a user may select options for multiple separate summary portal pages, where the selected options trigger opening separate summary portal pages. For example, a user may select an option for a summary portal page with records for the news portlet as recorded daily. A user may further select an option 716 to automatically trigger a summary portal page, based on the selected frequency, such as triggering a summary portal page each day with portlet instances specified according to the records of the news portlet for the day.

It will be understood that portal summary selection interface 700 may include additional or alternate options. In addition, it will be understood that a system administrator or user may specify the types of options to be included within portal summary selection interface 700. Further, a user may select to view portal summary selection interface 700 or portal summary selection interface controller 406 may automatically trigger display of portal summary selection interface 700 periodically or responsive to different conditions.

It is important to note that in addition to portal status recorder 402 monitoring portal usage of one or more portal pages, portal status recorder 402 may monitor portal usage of a summary portal page and records of portal usage of a summary portal page may be included within portal summary selection interface 700 for user selection to include in another summary portal page. In one example, a summary portal page may include portlet instances specified according to recorded data options from portal status database 404, but the user could specify a preference to record the content accessed for the previously selected data options within the summary portal page and present the summary of the content recordings in the same or an alternate summary portal page.

It is also important to note that in displaying records from portal status database 404, portal summary interface controller 406 may detect which records within portal status database 404 include redundant information and graphically illustrate redundant records within portal summary selection interface 700. For example, if multiple records for a financial portlet include a same data option selection, each of the redundant records may be graphically highlighted to show the redundancy. In addition, portal summary selection interface controller 406 may include options within portal summary selection interface 700 to combine all redundant records into a single portlet instance within a summary portal page with timestamps displayed with the portlet instance for each of the redundant records.

Figure 8:
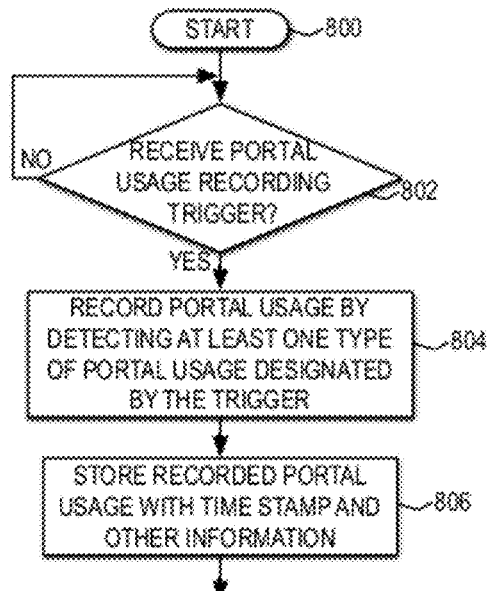
FIG. 8 is a high level logic flowchart depicting a program and process for recording portal usage.

Referring now to FIG. 8, a high level logic flowchart depicts a program and process for recording portal usage. In the example, the process starts at block 800 and thereafter proceeds to block 802. Block 802 depicts the portal summary controller determining whether a trigger to record portal usage is received. The trigger may occur based on a user selection, a specified condition being met within portal summary preferences 410, or other events. If the portal summary controller receives a trigger to record portal usage, then the process passes to block 804.

Block 804 illustrates recording portal usage by detecting at least one type of portal usage designated for recording by the trigger. For example, the trigger may specify recording a particular portlet instance, a particular type of portlet, or all portlets. In addition, the trigger may specify recording content, data option selections, or other criteria specifying what to record. Next, block 806 depicts storing the recorded portal usage in a record within the portal status database with time stamp and other information, and the process ends.

Figure 9:
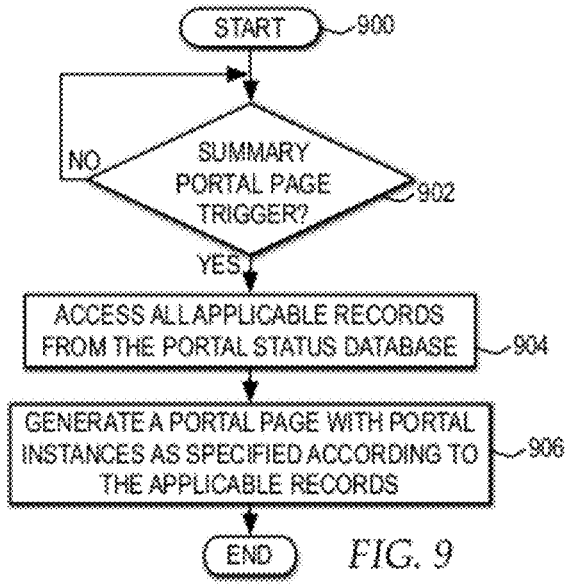
FIG. 9 is a high level logic flowchart illustrating a program and process for generating a summary portal page.

With reference now to FIG. 9, a high level logic flowchart illustrates a program and process for generating a summary portal page. In the example, the process starts at block 900 and thereafter proceeds to block 902. Block 902 illustrates the portal summary controller determining whether a trigger to generate a summary portal page is detected. If the portal summary controller detects a trigger to generate a summary portal page, then the process passes to block 904.

Block 904 depicts accessing all applicable records for the summary portal page from the portal status database. In determining applicable records, the portal summary controller may prompt the user to select from record options, may receive previously selected records, may detect record selections or rules for selecting records from the portal summary preferences, or may detect applicable records from other events or sources. Next, block 906 illustrates generating a summary portal page with portal instances as specified according to the applicable records, and the process ends.

Figure 10:
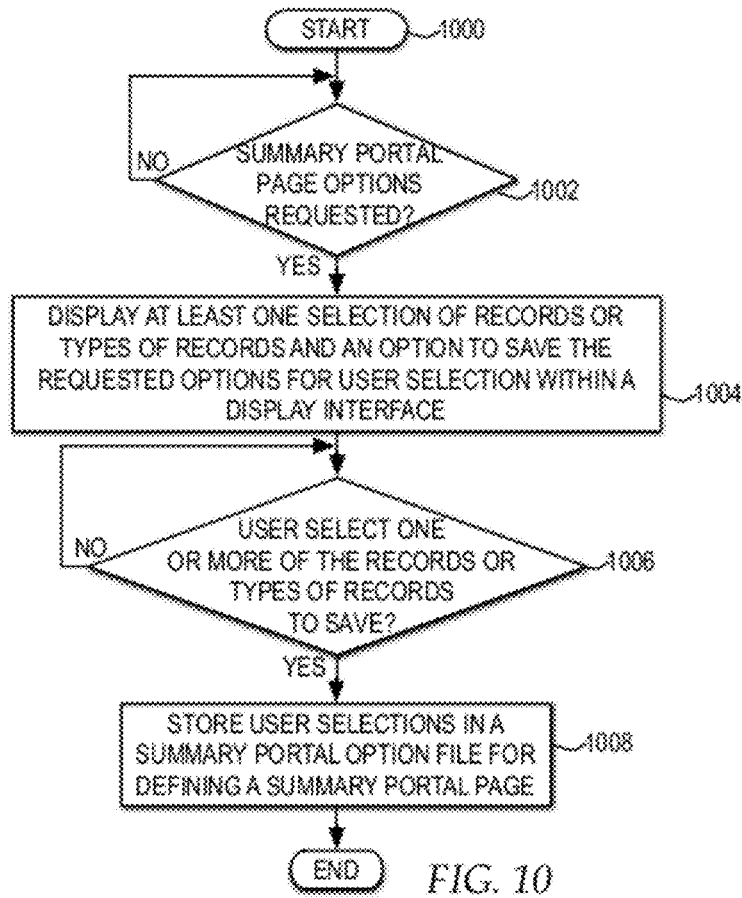
FIG. 10 is a high level logic flowchart depicting a program and process for specifying a summary portal page.

Referring now to FIG. 10, a high level logic flowchart depicts a program and process for specifying a summary portal page. In the example, the process stars at block 1000 and thereafter proceeds to block 1002. Block 1002 depicts the portal summary controller determining whether an option to specify a summary portal page is triggered or requested. If the portal summary controller detects a trigger to specify a summary portal page, then the process passes to block 1004.

Block 1004 illustrates displaying at least one selection of records or types of records from the portal status database and an option to save the requested options, for user selection within a display interface. In addition, as previously described with reference to FIG. 7, the display may also include additional filtering options and may include options to automatically trigger summary portal page generation based on selected options.

Next, block 1006 depicts the portal summary controller determining whether the user has completed the summary portal page specification by selecting to save the selected records or types of records and other selected options. If the user selects to save the selected options, then the process passes to block 1008. Block 1008 illustrates storing the user selections in a summary portal option file for defining a summary portal page, and the process ends.

While the invention has been particularly shown and described with reference to a preferred embodiment, it will be understood by those skilled in the art that various changes in form and detail may be made therein without departing from the spirit and scope of the invention.

What is claimed is:

1. A system for creating a portal page summarizing previous portal page usage comprising:
   a portal status recorder comprising a processor connected to a memory and operative to store detected usage of at least one instance of at least one portlet application within at least one portal page separately at each of a plurality of different times;
   the at least one portlet application operative to dynamically generate content for each of the at least one instance of the at least one portlet application based on a first data option selected from among a plurality of data options selectable within the at least one portlet application from a first selection of separate data accesses to at least one data storage system delivering a first selection of data for each at least one portlet application;
   the portal status recorder operative to store the detected usage of the at least one instance of the at least one portlet application by storing the dynamically generated content for each of the at least one instance of the at least one portlet application and the first data option;

a summary portal generator operative to dynamically create a summary portal page displaying a separate instance of the at least one portlet application for at least one of each of the plurality of different times specified according to the detected usage separately stored at each of the plurality of different times, wherein the summary portal page provides a summary of at least a selection of a previous usage of the at least one portal page comprising each separate instance of the at least one portlet application that functions as if placed on the at least one portal page;

the summary portal generator, responsive to a user selection to generate the summary portal page, operative to dynamically create the summary portal page displaying at least one first instance of the at least one portlet application specified according to the stored detected usage comprising the dynamically generated content and displaying a second instance of the at least one portlet application specified with a second selection of dynamically generated content generated based on the first data option in the detected usage from a current data access to the at least one data storage system delivering the second selection of data different from the first selection of data and not previously stored in the detected usage; and the summary portal generator, responsive to detecting the dynamically generated content from the current data access, operative to graphically distinguish the second selection of dynamically generated content from the dynamically generated content to visually distinguish the second selection of dynamically generated content from the dynamically generated content within the summary portal page.

2. The system according to claim 1, further comprising:
the portal status recorder operative to monitor for the dynamically generated content comprising separate dynamically generated HTML fragments for the at least one instance of the at least one portlet application; and
the portal status recorder operative to store the dynamically generated content by at least one of capturing data points from the separate dynamically generated HTML fragments and storing the data points, storing the dynamically generated HTML fragments, and capturing a snapshot of the displayed HTML fragments and storing the captured snapshot.

3. The system according to claim 1 further comprising:
the portal status recorder operative to monitor at each of the plurality of different times for the usage comprising user selection of a particular data option from among a plurality of data options within at least one instance of the at least one portlet application, wherein each of the plurality of data options is linked to a different type of data access from at least one data storage system.

4. The system according to claim 1 further comprising:
the portal status recorder operative to enable a selectable option within a particular instance of the at least one portlet application to save the usage of the particular instance; and
the portal status recorder, responsive to detecting a user selection of the selectable option within the particular instance, operative to store the detected usage of the particular instance.

5. The system according to claim 1 further comprising:
a portal summary selection interface controller operative to facilitate an interface through which a user designates a selection of records from among a plurality of records representing a selection of the detected usage to include in the new portal page; and
the summary portal generator operative to dynamically create the summary portal page displaying separate instances of the at least one portlet application for each portlet application usage recorded in the selection of records and specifying the separate instances of the at least one portlet application according to at least one of a data option selection and previously generated content within each of the selection of records.

6. The system according to claim 1, further comprising:
the summary portal generator, responsive to detecting a user selection of an updated data option from among the plurality of data options selectable within the separate instance of the at least one portlet application from among the first instance and the second instance, operative to update at least one selection of content within the separate instance with updated dynamically generated content from current data accessed from the at least one data storage system delivering a third selection of data for the updated data option different from the first selection of data and the second selection of data; and
the summary portal generator, responsive to detecting the updated dynamically generated content from content data accessed for the updated data option, operative to detect a selection of records in the first selection of data, the second selection of data, and the third selection of data that are redundant and to graphically distinguish the redundant selection of records from the remaining content currently displayed to visually distinguish the redundant selection of records from the remaining content within the summary portal page.

7. A method for creating a portal page summarizing previous portal page usage comprising:
dynamically generating content for each of at least one instance of at least one portlet application within at least one portal page based on a first data option selected from among a plurality of data options selectable within the at least one portlet application from a first selection of separate data accesses to at least one data storage system delivering a first selection of data for each at least one portlet application;

storing detected usage of the at least one instance of the at least one portlet application within the at least one portal page separately at each of a plurality of different times by storing the dynamically generated content for each of the at least one instance of the at least one portlet application and the first data option;

responsive to a user selection to generate the summary portal page, dynamically creating a summary portal page displaying a separate instance of the at least one portlet application for at least one of each of the plurality of different times specified according to the detected usage separately stored at each of the plurality of different times, such that the summary portal page provides a summary of at least a selection of a previous usage of the at least one portal page comprising each separate instance of the at least one portlet application that functions as if placed on the at least one portal page, by dynamically creating the summary portal page displaying at least one first instance of the at least one portlet application specified according to the stored detected usage comprising the dynamically generated content and displaying a second instance of the at least one portlet application specified with a second selection of dynamically generated content generated based on the first data option in the detected usage from a current data access to the at least one data storage system delivering the second selection of data different from the first selection of data and not previously stored in the detected usage; and responsive to detecting the dynamically generated content from the current data access, graphically distinguishing the second selection of dynamically generated content from the dynamically generated content to visually distinguish the second selection of dynamically generated content from the dynamically generated content within the summary portal page.

8. The method according to claim 7, further comprising:
monitoring for dynamically generated content comprising separate dynamically generated HTML fragments for the at least one instance of the at least one portlet application; and storing the dynamically generated content by at least one of capturing data points from the separate dynamically generated HTML fragments and storing the data points, storing the dynamically generated HTML fragments, and capturing a snapshot of the displayed HTML fragments and storing the captured snapshot.

9. The method according to claim 7 wherein storing detected usage of at least one instance of a particular portlet application within at least one portal page separately at each of a plurality of different times further comprises:
monitoring at each of the plurality of different times for the detected usage comprising user selection of a particular data option from among a plurality of data options within at least one instance of the at least one portlet application, wherein each of the plurality of data options is linked to a different type of data access from at least one data storage system.

10. The method according to claim 7 wherein storing detected usage of at least one instance of a particular portlet application within at least one portal page separately at each of a plurality of different times further comprises:
enabling a selectable option within a particular instance of the at least one portlet application to save usage of the particular instance; and responsive to detecting a user selection of the selectable option within the particular instance, storing the detected usage of the particular instance.

11. The method according to claim 7 wherein dynamically creating a summary portal page displaying a separate instance of the at least one portlet application for at least one of each of the plurality of different times specified according to the detected usage separately stored at each of the plurality of different times further comprises:
responsive to a trigger to create a summary portal page, accessing stored detected usage of the at least one instance of the at least one portlet at at least one of the plurality of different times, wherein the stored detected usage comprises at least one selection of at least one data option from among a plurality of data options within the at least one instance of the at least one portlet application;

accessing current data for the at least one data option for the at least one portlet application; and dynamically generating content for display within the separate instance of the at least one portlet application from the current data.

12. The method according to claim 7 wherein dynamically creating a summary portal page displaying a separate instance of the at least one portlet application for at least one of each of the plurality of different times specified according to the detected usage separately stored at each of the plurality of different times, such that the summary portal page provides a summary of previous usage of the at least one portal page further comprises:
facilitating an interface through which a user designates a selection of records from among a plurality of records representing a selection of the detected usage to include in the new portal page; and dynamically creating the summary portal page displaying separate instances of the at least one portlet application for each portlet application usage recorded in the selection of records and specifying the separate instances of the at least one portlet application according to at least one of a data option selection and previously generated content within each of the selection of records.

13. The method according to claim 7, further comprising:
responsive to detecting a user selection of an updated data option from among a plurality of data options selectable within the separate instance of the at least one portlet application from among the first instance and the second instance, updating at least one selection of content within the separate instance with updated dynamically generated content from current data accessed from the at least one data storage system delivering a third selection of data for the updated data option different from the first selection of data and the second selection of data; and responsive to detecting the updated dynamically generated content from content data accessed for the updated data option, operative to detect a selection of records in the first selection of data, the second selection of data, and the third selection of data that are redundant and to graphically distinguishing the redundant selection of records from the remaining content currently displayed to visually distinguish the redundant selection of records from the remaining content within the summary portal page.

14. A computer program product for creating a portal page summarizing previous portal page usage, the computer program product comprising:
one or more computer-readable tangible storage devices;
program instructions, stored on at least one of the one or more storage devices, to store detected usage of at least one instance of at least one portlet application within at least one portal page separately at each of a plurality of different times;

program instructions, stored on at least one of the one or more storage devices, to dynamically generate content for each of the at least one instance of the at least one portlet application based on a first data option selected from among a plurality of data options selectable within the at least one portlet application from a first selection of separate data accesses to at least one data storage system delivering a first selection of data for each at least one portlet application;

program instructions, stored on at least one of the one or more storage devices, to store the detected usage of the at least one instance of the at least one portlet application by storing the dynamically generated content for each of the at least one instance of the at least one portlet application and the first data option;

program instructions, stored on at least one of the one or more storage devices, to dynamically create a summary portal page displaying a separate instance of the at least one portlet application for at least one of each of the plurality of different times specified according to the detected usage separately stored at each of the plurality of different times comprising each separate instance of the at least one portlet application that functions as if placed on the at least one portal page;

program instructions, stored on at least one of the one or more storage devices, responsive to a user selection to generate the summary portal page, to dynamically create the summary portal page displaying at least one first instance of the at least one portlet application specified according to the stored detected usage comprising the dynamically generated content and displaying a second instance of the at least one portlet application specified with a second selection of dynamically generated content generated based on the first data option in the detected usage from a current data access to the at least one data storage system delivering the second selection of data different from the first selection of data and not previously stored in the detected usage; and program instructions, stored on at least one of the one or more storage devices, responsive to detecting the dynamically generated content from the current data access, to graphically distinguish second selection of dynamically generated content from the dynamically generated content to visually distinguish the second selection of dynamically generated content from the dynamically generated content within the summary portal page.

15. The program product according to claim 14, further comprising:

program instructions, stored on at least one of the one or more storage devices, to monitor for the dynamically generated content comprising separate dynamically generated HTML fragments for the at least one instance of the at least one portlet application; and program instructions, stored on at least one of the one or more storage devices, to store the dynamically generated content by at least one of capturing data points from the separate dynamically generated HTML fragments and storing the data points, storing the dynamically generated HTML fragments, and capturing a snapshot of the displayed HTML fragments and storing the captured snapshot.

* * * * *